United States Patent [19]
Chan

[11] Patent Number: 5,805,655
[45] Date of Patent: Sep. 8, 1998

[54] PROTECTIVE COATING TO REDUCE STRESS CORROSION CRACKING IN ZIRCONIUM ALLOY SHEATHING

[75] Inventor: Paul Ka-Hang Chan, Mississauga, Canada

[73] Assignee: Atomic Energy of Canada Limited, Canada

[21] Appl. No.: 838,801

[22] Filed: Apr. 10, 1997

[51] Int. Cl.$^6$ .................................................. G21C 3/20
[52] U.S. Cl. ...................... 376/415; 376/417; 106/14.05; 427/6
[58] Field of Search ...................... 376/415, 416, 376/417, 457; 420/422; 427/5, 6; 148/281, 421, 672; 106/14.05, 14.13, 286.4, 450

[56] References Cited

U.S. PATENT DOCUMENTS

| | | | |
|---|---|---|---|
| 3,069,338 | 12/1962 | Schaner et al. | 376/415 |
| 3,925,151 | 12/1975 | Klepfer | 376/415 |
| 4,541,984 | 9/1985 | Palmer | 376/415 |
| 4,610,842 | 9/1986 | Vannesio | 376/416 |
| 4,613,479 | 9/1986 | Foster | 376/416 |
| 4,618,406 | 10/1986 | Wakashima et al. | 376/417 |
| 4,675,153 | 6/1987 | Boyle et al. | 376/416 |
| 4,783,311 | 11/1988 | Ferrari | 376/417 |
| 4,894,203 | 1/1990 | Adamson | 376/416 |
| 5,026,516 | 6/1991 | Taylor | 376/416 |
| 5,073,336 | 12/1991 | Taylor | 376/457 |
| 5,436,947 | 7/1995 | Taylor | 376/416 |
| 5,469,481 | 11/1995 | Adamson et al. | 376/416 |
| 5,475,723 | 12/1995 | Marlowe | 376/416 |

OTHER PUBLICATIONS

P.K. Chan et al, "Sheath–Protection Mechanism Afforded by Canlub", 13$^{th}$ Annual Conference of the Canadian Nuclear Society, Saint John, New Brunswick, Jun. 1992.

P.K. Chan et al., "The Role of $Zr_xI_yC$ Compounds in Minimizing Stess Corrosion Cracking in Fuel Cladding", Third International Conference on CANDU Fuel, Pembroke, Ontario, Oct. 1992.

P.K. Chan et al, "How Does CANLUB Work", 15$^{th}$ Annual Conference of the CNA/CNS, Montreal, Quebec, Jun. 1994.

P.K. Chan et al., "Studies of Irradiated Zircaloy Fuel Sheating Using XPS", 16$^{th}$ Annual Conference of the CNS, Saskatoon, Saskatchewan, Jun. 1995.

P.K. Chan et al., "The Active 'Ingredient' in CANLUB", 4$^{th}$ Annual Conference on CANDU Fuel, Pembroke, Ontario, Oct. 1995.

J.S. Armijo et al., "Development of Zirconium–Barrier Fuel Cladding", Tenth International Symposium, ASTM STP 1245, A.M. Garde and E.R. Bradley, Eds. ASTM, Philadelphia, pp. 3–18, 1994.

*Primary Examiner*—Daniel D. Wasil
*Attorney, Agent, or Firm*—Jon Carl Gealow

[57] ABSTRACT

A protective coating to reduce stress corrosion cracking of zirconium alloy sheathing in nuclear reactors. The coating is graphite based and includes $ZrO_2$ and ethyl cellulose and acts as a sacrificial layer to immobilize fission products by formation of $Zr_xI_yC$ type compounds which do not cause stress corrosion cracking.

22 Claims, 1 Drawing Sheet

PROTECTIVE COATING TO REDUCE STRESS CORROSION CRACKING IN ZIRCONIUM ALLOY SHEATHING

This invention relates to a protective coating to reduce stress corrosion cracking of zircaloy sheathing.

BACKGROUND OF THE INVENTION

Nuclear reactor fuel elements can fail by stress corrosion cracking (SCC) of the zirconium alloy sheathing of fuel elements during, or following, power ramps. Such failures result from the combined actions of localized stresses and corrosive fission products.

One approach to reduce SCC is to provide a layer of a material which will absorb the fission products from the fuel. Such layers are conventionally formed on the inside of the sheathing tube or on the outside of the fuel pellet.

In another approach to combat the problem, coatings have been developed to reduce the operating stress in the sheathing below the critical level for SCC. Such coatings have conventionally been used to impart lubricating qualities. One such coating conventionally used in CANDU type reactors is sold under the trade-mark CANLUB. CANLUB is applied as a thin coating (3–20 $\mu$m) to the inner surface of the fuel sheathing; i.e., between the sheathing and the fuel pellets. There are a number of different CANLUB coatings in use including a graphite slurried in isopropanol (known as ALCADAG-154 sold by Acheson Colloids), a polysiloxane type of vacuum grease (available from Dow Chemicals) and a graphite slurried in water containing colloidal alumina and silica (Acheson Colloids).

In some prior systems, the combined use of graphite lubricants and fission product absorbers have been proposed. For example, in U.S. Pat. No. 4,783,311 Ferrari, the use of a layer of graphite lubricant on the inside surface of the sheathing and a separate layer on the fuel pellets containing absorbers (for example $ZrB_2$) or materials having a relatively low neutron absorption (for example $ZrO_2$) is disclosed. Similarly in U.S. Pat. No. 4,541,984 Palmer, the use of a single layer containing a graphite lubricant and a "gettering" agent to absorb fission products is proposed.

In such prior art systems that employ graphite coatings, it has conventionally been assumed that the beneficial effects of graphite coatings on fuel performance is attributable to lubrication of the fuel-sheathing interface. Thus, in Ferrari, the lubricating effect of the graphite is intended to be achieved by providing the graphite layer physically separate from the absorber layer, with each layer independently performing its intended function.

In Palmer, a gettering agent is homogeneously dispersed in a graphite lubricant matrix together with a binder. While many different gettering agents are disclosed, Palmer specifies that the gettering agents must be modified for compatibility in the coating system to minimize the effect on the coating lubricant efficiency. For example, in the case of a gettering agents for halogens, Palmer limits the gettering agents to that which will form intercalates of graphite, so as to preserve the lubricating qualities of the graphite. This requirement excludes many gettering agents that are too stable to be intercalated with graphite, including $ZrO_2$.

Although conventional graphite coatings has proven successful within the normal operating envelope of the $UO_2$ fuel cycle in CANDU type reactors, which undergo routine power-ramping of CANDU fuel, increased power (ramp) demands on advanced fuels, extended burn-ups etc., can push the such coatings beyond their ability to protect the fuel sheathing. Accordingly, there is a need for an advanced SCC preventative coating for use in the development of advanced fuel cycles operating to extended burn-ups.

BRIEF SUMMARY OF THE INVENTION

The present invention is based on the understanding that has been gained as to the true mechanism of the reduction of stress corrosion cracking in graphite based coatings. The assumption that the reduction in SCC is attributable to the lubricating qualities of graphite has been shown to be wrong. Graphite depends upon its intermolecular lamellar structure to impart lubricating properties. The ability of the intermolecular layers to slide is dependent upon the presence of a certain amount of moisture. However, moisture levels in an operating reactor are insufficient for this purpose. For example, in CANDU type reactors, the total hydrogen gas derived from any source in a fuel element is less than 1.0 mg. Because of the low moisture content, graphite cannot act as a lubricant.

It has been determined that the observed beneficial effects of graphite based coatings on fuel performance stems primarily from the interaction of the coating with fission products, rather than from lubrication of the fuel-sheathing interface. There is evidence that the chemical step involved in preventing SCC of fuel sheathing with conventional graphite coatings is the formation of $Zr_xI_yC$ type compounds. The $Zr_xI_yC$ type compounds are produced in the presence of zirconium (from sheathing) and a minute quantity of organic carbon in the graphite coating. Experiments have suggested that the power ramp performance of the fuel can be improved with a lower graphite layer curing temperature or a thicker coating, probably because the number of volatile carbons increases in both cases. Zircaloy sheathing has been found to be more susceptible to SCC when the graphite coating is baked at temperatures higher than 365° C. This result appears to be consistent with nuclear magnetic resonance and Raman data showing that ethyl cellulose in the conventional ALCADAG-154 based conventional CANLUB graphite coating decomposes at 350° C. and disappears at 400° C. Therefore, ethyl cellulose is suggested to be the key ingredient that is critical to the function of such coating.

The present invention recognizes that in reactor conditions, ALCADAG-154 based graphite CANLUB reduces SCC of Zircaloy sheathing by immobilizing the fission products into $Zr_xI_yC$ type compounds which do not cause SCC. The coatings of the present invention are therefore formulated to provide a sacrificial layer for the formation of $Zr_xI_yC$ type compounds.

Thus in accordance with the present invention, there is provided a coating for reducing SCC in zirconium alloy substrate comprising a colloidal suspension in alcohol of graphite and $ZrO_2$ with a binder of ethyl cellulose.

In accordance with another aspect of the present invention, the coating is formed from a mixture of a dispersion of graphite in isopropanol with a binder of ethyl cellulose and an aqueous dispersion of $ZrO_2$ in alcohol.

In accordance with another aspect of the present invention, there is provided a zirconium alloy tube having a coating comprising a colloidal suspension in alcohol of graphite and $ZrO_2$ with a binder of ethyl cellulose sintered on the inside surface thereof.

In accordance with another aspect of the present invention, there is provided nuclear reactor fuel element comprising a nuclear fuel material, a zirconium alloy sheath containing said fuel material, and a coating comprising a colloidal suspension in alcohol of graphite and $ZrO_2$ with a binder of ethyl cellulose sintered on the inside surface of said sheath.

In accordance with another aspect of the present invention, there is provided a method for producing a coated zirconium fuel sheathing element comprising the steps of applying a coating comprising a colloidal suspension in alcohol of graphite and $ZrO_2$ with a binder of ethyl cellulose to the inside surface of said sheathing element and sintering said coating.

DESCRIPTION OF THE PREFERRED EMBODIMENTS

Figure 1:
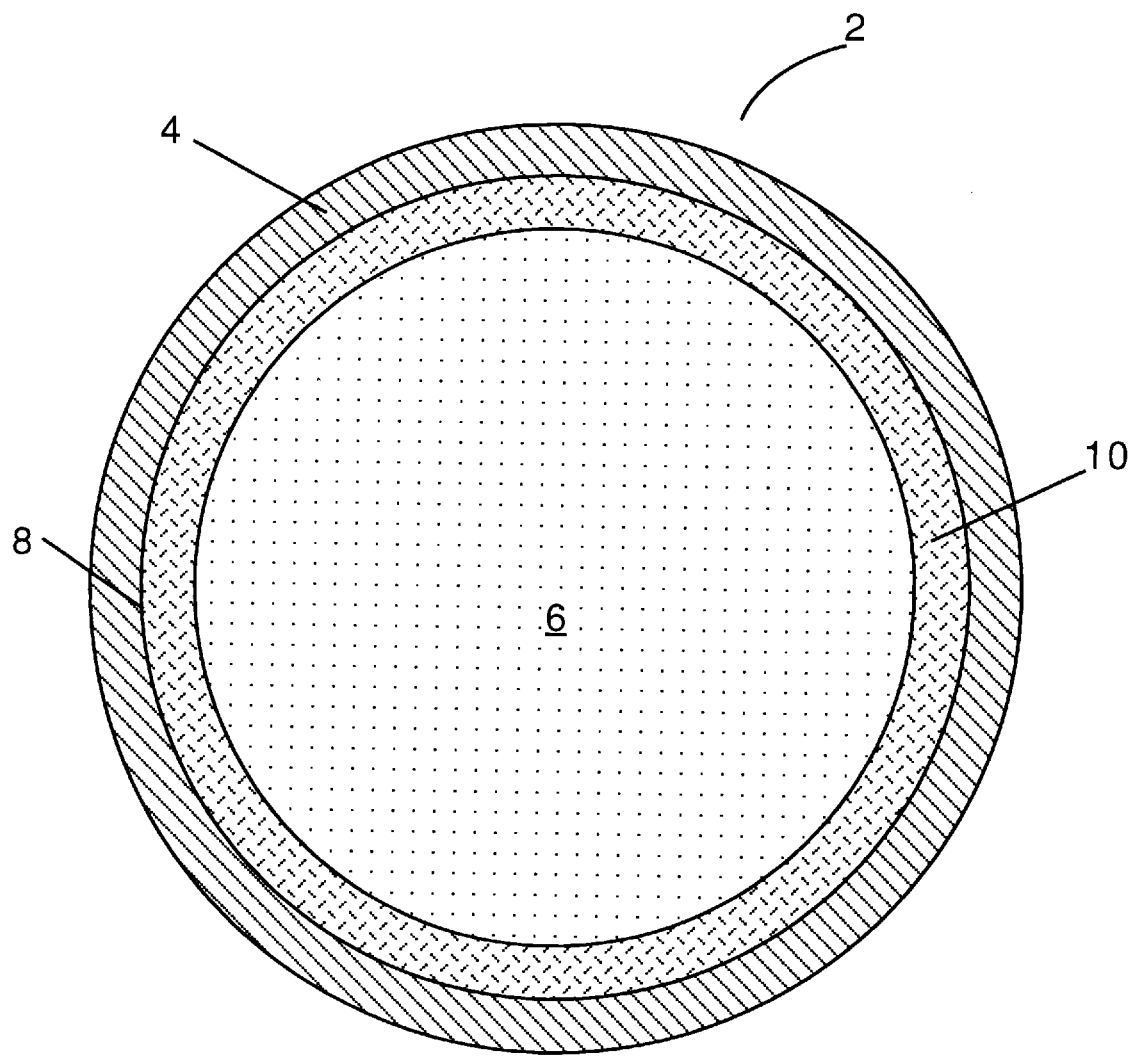
FIG. 1 is a cross-sectional view of a nuclear reactor fuel element in which the inside surface of the sheathing has applied thereto the coating of the present invention.

The present invention provides an improved graphite based coating to reduce SCC of zirconium alloy fuel elements in a nuclear reactor.

Referring to FIG. 1, a fuel element, generally indicated by reference numeral 2 comprises cylindrical sheathing 4 made from Zircaloy-4 and fuel pellet 6 forming its central core. Sheathing 4 has coated on inside surface 8, protective coating layer 10. Protective coating layer 10 of the present invention is a mixture of a graphite based coating together with $ZrO_2$.

The graphite based coating is a conventional coating comprising a dispersion of graphite in isopropanol with ethyl cellulose as a binder. One commercially available product is sold by Acheson Colloids Ltd. of Brantford, Ontario under the trade-mark ALCADAG-154. The nominal composition of ALCADAG-154 is as follows:

| Solids: | 20 wt % | Graphite | 80 wt % |
|---|---|---|---|
| | | Ethyl Cellulose | 20 wt % |
| Solvents: | 80 wt % | Isopropanol | 94 wt % |
| | | n-Butanol | 2 wt % |
| | | Hexylene Glycol | 2 wt % |
| | | Propylene Glycol Monomethyl Ether | 2 wt % |

The $ZrO_2$ that is suitable for use in the present invention is preferably in the form of stable non-settling colloid of zirconium dioxide in alcohol and water. Preferably, the colloid has a concentration of 1–10 grams of $ZrO_2$ per liter and a $H_2O/Zr$ molar ratio of between 80/1 to 1/1.

A suitable $ZrO_2$ colloid can be produced by mixing n-propanol diluted water with an n-propanol diluted solution of zirconium n-propoxide to form a solution having nanometer-sized particles with a colloid concentration of 1–10 grams of $ZrO_2$ per liter and a $H_2O/Zr$ molar ratio of between 80/1 to 1/1 and allowing the solution to form a stable colloid by agglomeration of the nanometer-sized particles into amorphous clusters.

A preferred $ZrO_2$ colloid for use in the present invention has a concentration of 5 g/l $ZrO_2$ and a $H_2O/Zr$ molar ratio of 6/1, and can be prepared according to the following procedure:
 a) 20 ml of stock zirconium n-propoxide (approximately 2.2 molar) was diluted with n-propanol to a final volume of 140 ml (approximately 0.3 molar);
 b) 5 ml of water was diluted with n-propanol to a final volume of 860 ml (approximately 0.3 molar);
 c) solution b) was added to solution a) at a rate of 10–30 ml/min with stirring;
 d) the solution was let stand for 24 hours for agglomeration to complete at which time the colloid was translucent.

The $ZrO_2$ colloid prepared by the above procedure is mixed with the graphite colloid to produce the coating of the present invention. While the amount of $ZrO_2$ colloid will vary depending upon the application, it has been found that the use of 1:1 to 1:25 vol % of the $ZrO_2$ colloid in the ALCADAG-154 graphite colloid produces good results. A further dilution with alcohol may also be needed to obtain the desired viscosity. One preferred coating of the present invention uses 1:20 vol % of the $ZrO_2$ in the ALCADAG-154 graphite colloid.

The coating is applied to the inside surface of the zircaloy tubing, for example by spraying, withdrawing the tubing from the coating at a controlled rate, or by back flushing the tubing element with the coating. The coated tubing is then sintered at a temperature ranging from 300° to 450° C. in a vacuum to bake the coating onto the tubing in a layer between 3–20 microns thick. Sintering conditions of 350° C. for two hours at $10^{-1}$ to $10^{-8}$ torr have been found to produce an effective coating layer.

The present invention is based, in part, on the recognition that the resulting fission products, such as iodine, are immobilized by volatile carbon in ALCADAG-154 to form $Zr_xI_yC$ compounds, thereby preventing SCC of fuel sheathing. When applied to the inside of the Zircaloy fuel tubing elements, the coating of the present invention functions to reduce SCC in a manner unlike that of the use of graphite coatings and $ZrO_2$ in the prior art. It is believed that the coating of the present invention protects the Zircaloy sheathing from contact and reaction with gases and fission products released from the fuel pellets, and thereby reduce the SCC susceptibility of the sheathing at extended burn-up. In particular, it is believed that the coating of the present invention facilitates the formation of $Zr_xI_yC$ type compounds without causing corrosion of the sheath. The $ZrO_2$ and ethyl cellulose in the coating of the present invention are used as reactants, i.e., as a sacrificial layer for the reaction with fission product iodine to form $Zr_xI_yC$ type compounds. Because the zirconium in the formed $Zr_xI_yC$ type compounds comes from the $ZrO_2$ in the coating and not from the fuel tubing, the attack by corrosive fission products on zirconium in the cladding is reduced. Therefore the sheathing is protected and not attacked by iodine.

Experiments have shown that the coating of the present invention decreases the iodine induced SCC susceptibility of Zircaloy fuel sheathing. For example, when slotted C-rings are loaded with high stress, conventional ALCADAG 154 graphite coating looses its SCC mitigation properties and defects occur within 6 hours. With the coating of the present invention, defects are not observed until after fourteen hours.

Apart from this sacrificial layer effect, it is believed that the coating of the present invention offers other advantages over the conventional use of graphite based coatings. It is thought that the rate at which the coating disappears at high burn-up is decreased, likely because the presence of zirconium atoms in the coating causes an increase in surface area or an increase in entropy. Moreover, it is believed that the zirconium atoms in the coating can also react with oxygen released from the fuel pellets during normal operating conditions, and hence the amount of oxygen that remains in the fuel may be reduced.

The coating of the present invention offers a number of advantages. It can be coated onto sheathing by methods routinely used with conventional graphite based coatings. There, the present invention does not require new coating technology or equipment and thus the fuel manufacturing costs do not increase. The coating of the present invention can contain the conventional impurities found in DAG-154 based CANLUB coating and can be formulated to conform to AECL Technical Specification (TS-XX-37356-2) entitled "Graphite CANLUB Coating on Fuel Sheaths". Other graphite based coatings such as disclosed in U.S. Pat. No. 4,541,984 Palmer require complex fabrication steps which greatly increase fabrication costs and are not practical for large scale production. The coating of the present invention does not significantly increase manufacturing cost over that associated with conventional graphite based coatings, and raises no environmental/safety/regulatory risks or concerns, since its production merely requires the addition of $ZrO_2$ to conventional ALCADAG-154 based CANLUB. Thus, the coating of the present invention is practical for conventional fuel production as well as for advanced fuel cycle development.

We claim:

1. A composition useful as a coating for reducing stress corrosion cracking in a zirconium alloy substrate comprising a colloidal suspension in alcohol of graphite and $ZrO_2$ with a binder of ethyl cellulose.

2. The composition of claim 1 wherein the colloidal suspension is formed from a mixture of a dispersion of graphite in isopropanol with a binder of ethyl cellulose and an aqueous dispersion of $ZrO_2$ in alcohol.

3. The composition of claim 2 wherein the aqueous dispersion of $ZrO_2$ in alcohol has a concentration 1–10 g/L $ZrO_2$ and a $H_2O/Zr$ molar ratio of between 80/1 to 1/1.

4. The composition of claim 3 wherein the dispersion of graphite in isopropanol consists approximately 10% by weight of graphite and 4% by weight of ethyl cellulose and the aqueous dispersion of $ZrO_2$ in alcohol has a concentration of about 5 g/L $ZrO_2$ and a $H_2O/Zr$ molar ratio of about 6/1.

5. The composition of claim 4 wherein the aqueous dispersion of $ZrO_2$ in alcohol is present in an amount of between about 1:1 and 1:25% by volume of the dispersion of graphite in isopropanol.

6. A zirconium alloy tube having a coating for reducing stress corrosion cracking sintered on the inside surface thereof, said coating comprising a colloidal suspension in alcohol of graphite and $ZrO_2$ with a binder of ethyl cellulose.

7. The tube of claim 6 wherein the colloidal suspension is formed from a mixture of a dispersion of graphite in isopropanol with a binder of ethyl cellulose and an aqueous dispersion of $ZrO_2$ in alcohol.

8. The tube of claim 7 wherein the aqueous dispersion of $ZrO_2$ in alcohol has a concentration 1–10 g/L $ZrO_2$ and a $H_2O/Zr$ molar ratio of between 80/1 to 1/1.

9. The tube of claim 8 wherein the dispersion of graphite in isopropanol consists approximately 10% by weight of graphite and 4% by weight of ethyl cellulose and the aqueous dispersion of $ZrO_2$ in alcohol has a concentration of about 5 g/L $ZrO_2$ and a $H_2O/Zr$ molar ratio of about 6/1.

10. The tube of claim 9 wherein the aqueous dispersion of $ZrO_2$ in alcohol is present in an amount of between about 1:1 and 1:25% by volume of the dispersion of graphite in isopropanol.

11. The tube of claim 10 wherein said sintered coating is between 3 to 20 microns thick.

12. A nuclear reactor fuel element comprising a nuclear fuel material, a zirconium alloy sheath containing said fuel material, and a coating for reducing stress corrosion cracking sintered on the inside surface of said sheath, said coating comprising a colloidal suspension in alcohol of graphite and $ZrO_2$ with a binder of ethyl cellulose.

13. The fuel element of claim 12 wherein the colloidal suspension is formed from a mixture of a dispersion of graphite in isopropanol with a binder of ethyl cellulose and an aqueous dispersion of $ZrO_2$ in alcohol.

14. The fuel element of claim 13 wherein the aqueous dispersion of $ZrO_2$ in alcohol has a concentration 1–10 g/L $ZrO_2$ and a $H_2O/Zr$ molar ratio of between 80/1 to 1/1.

15. The fuel element of claim 14 wherein the dispersion of graphite in isopropanol consists approximately 10% by weight of graphite and 4% by weight of ethyl cellulose and the aqueous dispersion of $ZrO_2$ in alcohol has a concentration of about 5 g/L $ZrO_2$ and a $H_2O/Zr$ molar ratio of about 6/1.

16. The fuel element of claim 15 wherein the aqueous dispersion of $ZrO_2$ in alcohol is present in an amount of between about 1:1 and 1:25% by volume of the dispersion of graphite in isopropanol.

17. The fuel element of claim 16 wherein said sintered coating is between 3 to 20 microns thick.

18. A method for producing a coated zirconium fuel sheathing element comprising the steps of applying to the inside surface of said sheathing element a coating comprising a colloidal suspension in alcohol of graphite and $ZrO_2$ with a binder of ethyl cellulose and then sintering said sheathing element and said coating in a vacuum at a temperature between 300° and 450° Celsius.

19. The method of claim 18 wherein the colloidal suspension is formed from a mixture of a dispersion of graphite in isopropanol with a binder of ethyl cellulose and an aqueous dispersion of $ZrO_2$ in alcohol.

20. The method of claim 19 wherein the aqueous dispersion of $ZrO_2$ in alcohol has a concentration 1–10 g/L $ZrO_2$ and a $H_2O/Zr$ molar ratio of between 80/1 to 1/1.

21. The method of claim 20 wherein the dispersion of graphite in isopropanol consists approximately 10% by weight of graphite and 4% by weight of ethyl cellulose and the aqueous dispersion of $ZrO_2$ in alcohol has a concentration of about 5 g/L $ZrO_2$ and a $H_2O/Zr$ molar ratio of about 6/1.

22. The method of claim 21 wherein the aqueous dispersion of $ZrO_2$ in alcohol is present in an amount of between about 1:1 and 1:25% by volume of the dispersion of graphite in isopropanol.

* * * * *